United States Patent [19]

Iizuka et al.

[11] 4,358,149
[45] Nov. 9, 1982

[54] ASH TRAY FOR VEHICLE

[75] Inventors: Mitsuru Iizuka, Yokohama; Yoshihiko Ishiyama, Isehara, both of Japan

[73] Assignee: Nissan Motor Co. Ltd., Yokohama, Japan

[21] Appl. No.: 197,808

[22] Filed: Oct. 17, 1980

[30] Foreign Application Priority Data

Oct. 25, 1979 [JP] Japan .................................. 54-137986

[51] Int. Cl.³ .............................................. B60N 3/08
[52] U.S. Cl. .................................. 296/37.9; 224/281
[58] Field of Search ............... 296/37.9; 224/281, 278; 312/242

[56] References Cited

U.S. PATENT DOCUMENTS 2,660,180 11/1953 Endicott et al. .................. 296/37.9
2,771,209 11/1956 Flynn ................................. 296/37.9
2,809,877 10/1957 Hammesfahr ...................... 296/37.9

FOREIGN PATENT DOCUMENTS 1043755 9/1966 United Kingdom .

Primary Examiner—Robert R. Song

[57] ABSTRACT

An ash tray for vehicle having outer and inner casings provided with a protector fitted on the outer casing, which protector can be in co-operation with the inner casing under the actuation of a spring, so as to cover the front of the instrument panel by stopping the outward movement thereof in an intermediate position of the inner casing. Consequently, the front of the instrument panel can be protected from burning or fire. Moreover, the protector does not at all obstruct the removal of accumulated butts when cleaning the inner casing.

4 Claims, 6 Drawing Figures

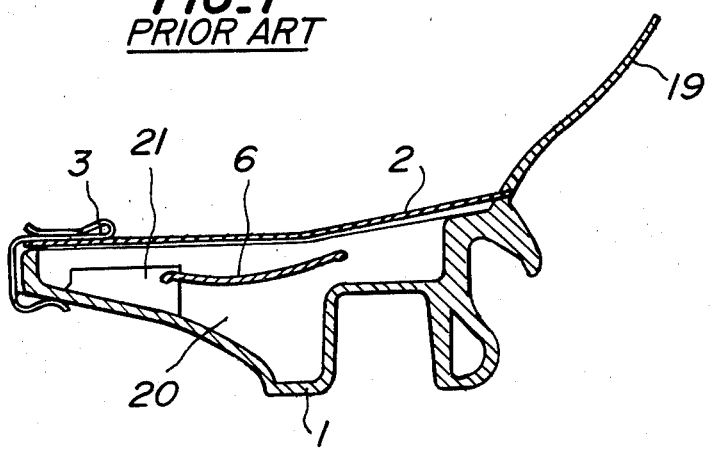
FIG._1
PRIOR ART
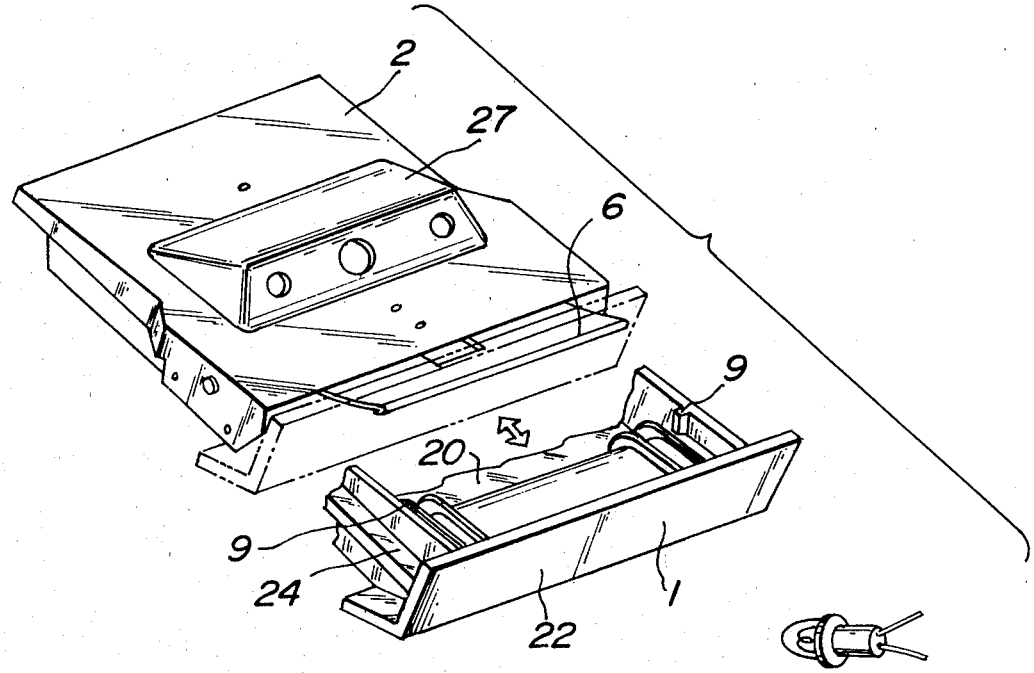
FIG._2

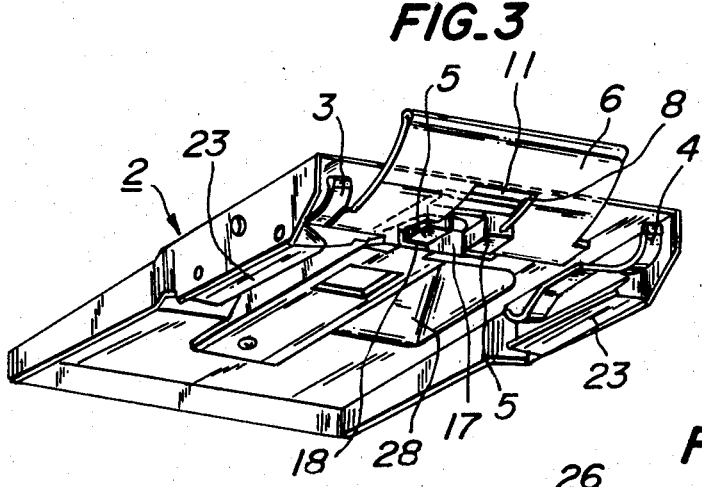
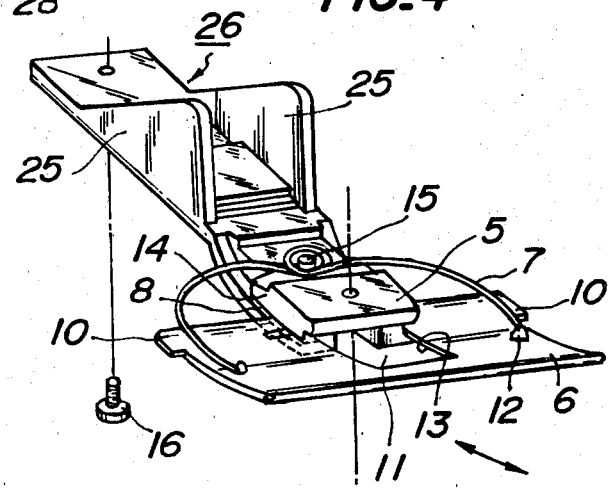
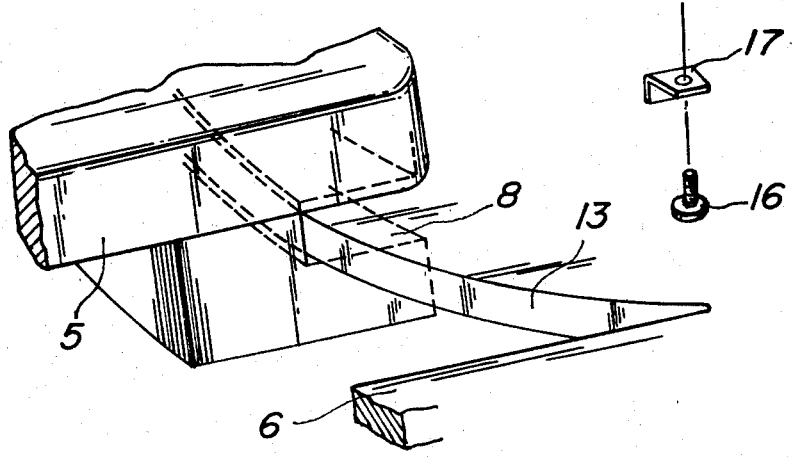

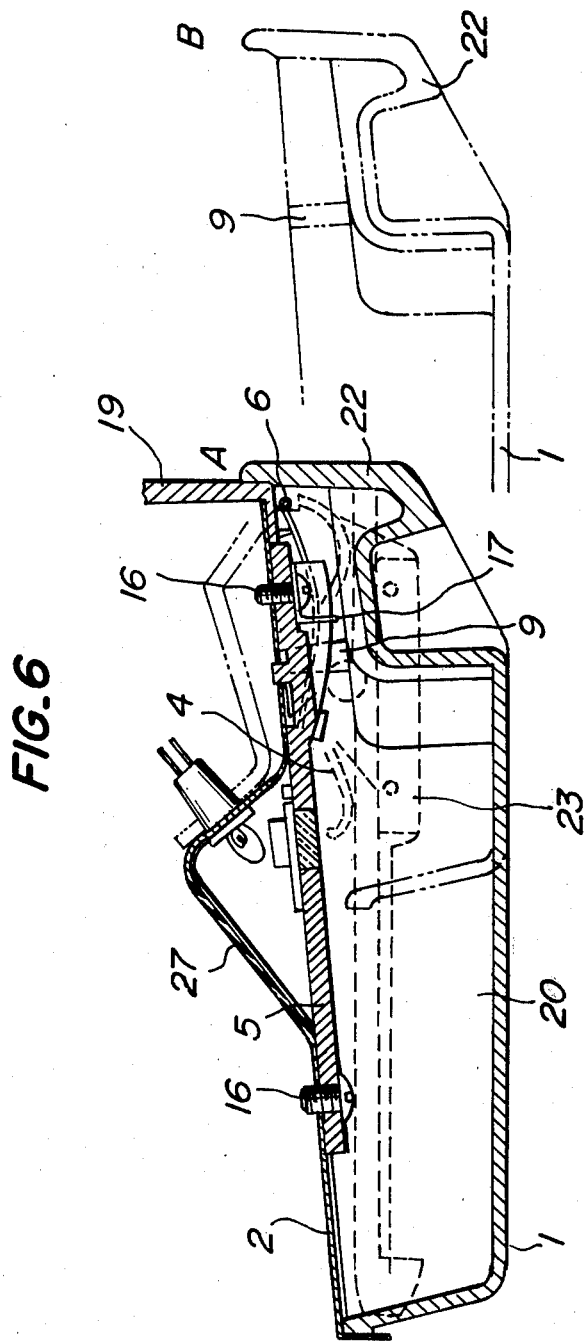

ASH TRAY FOR VEHICLE

BACKGROUND OF THE INVENTION

1. Field of the Invention

The present invention relates to an ash tray for a vehicle, particularly, of the drawer type, which is intended to protect the body of a vehicle from a fire and to facilitate the accommodation of as many butts as possible.

2. Description of the Prior Art

In almost all vehicles, for persons who smoke therein, ash trays are fitted in the lower part of an instrument panel, the rear of a front seat and the like, as shown in FIG. 1 for a conventional example. FIG. 1 is a longitudinal cross section showing the manner of fitting a conventional ash tray in the lower portion of the instrument panel.

The above described conventional ash tray is formed of an outer casing 2 which is secured on the lower edge of the instrument panel 19 and is opened towards the front seat from structural necessity and an inner casing 1 which is held within the outer casing 2 in such a manner that it can be drawn out and pushed in through the opening thereof and can be entirely concealed within the outer casing 2 in a closed position. The outer casing 2 is fitted with a guide spring 3, so as to prevent the unsteadiness of the inner casing 1 by pressing upper edges of upright walls thereof against the outer casing 2 when the inner casing 1 is moved outwardly and inwardly. Inside of the rear portion, of the inner casing 1, a flameproof protector 6 (referred to as "a protector" hereinafter) is mounted substantially flush with the upper edge of the upright wall thereof, so as to isolate a butt receiving chamber 20 from the instrument panel 19 which is situated immediately above it. This protector 6 is extended outwardly close to the midpoint of the inner casing 1, so as to facilitate deposition of butts into the chamber 20, and further is shaped in such a manner that the front of the instrument panel 19 is covered thereby, so as to prevent the instrument panel 19 from being scorched or burned.

However, in the above-mentioned conventional ash tray a protector mount 21 is provided inside the rear part of the inner casing 1, so as to fix the rear end of the protector 6 thereon, which is desired in that the space of the chamber 20 which is provided for depositing butts is reduced. Moreover, the protector 6 is extended outwardly only close to the midpoint of the inner casing 1, so that the protector 6 is entirely covered, in the front half of the inner casing 1. As a result, the protector 6 cannot isolate the inner casing 1 from the instrument panel 19, so as to protect the front thereof, unless the inner casing 1 has been completely withdrawn. Besides, when a half-smoked cigarette is deposited in the inner casing 1 which is drawn out in a half open state thereof, or it is left at the entrance portion thereof, the heat of the half-smoked cigarette is directly conducted to the instrument panel 19 which is coated with plastics and the like, so that there is a danger that the instrument board 19 is burnt or a fire may be caused in the vehicle. Furthermore, since, inside the inner casing 1, the protector 6, which is mounted substantially flush with the upper edge of the upright wall thereof, is disposed over the butt receiving chamber 20, the disposal of butts heaped in the chamber 20 is obstructed by the protector 6, so that troublesome cleaning thereof is caused.

SUMMARY OF THE INVENTION

An object of the present invention is to overcome the above-mentioned defects in vehicle ash trays.

Another object of the present invention is to provide an improved ash tray for a vehicle for protecting the body of the vehicle against a fire and for facilitating the deposit of a large number of butts.

The features of the ash tray according to the present invention are that a protector is slid out of an opening of an outer casing by drawing out an inner casing, so as to protect an instrument panel and that the protector is concealed within the outer casing substantially at the same time as the inner casing is closed, and further that the protector is mounted on the outer casing in such a manner that the space of the but receiving chamber is enlarged and the removal of butts can be carried out easily.

The present invention will be explained further in detail hereinafter by referring to the accompanied drawings.

BRIEF DESCRIPTION OF THE DRAWINGS

FIG. 1 is a longitudinal cross section showing an example of a conventional ash tray for vehicle as mentioned above;

FIG. 2 is a perspective view showing a manner of installation of outer and inner casings of an embodiment of an ash tray for a vehicle according to the present invention;

FIG. 3 is a perspective front and bottom view of the outer casing of an ash tray according to the present invention;

FIG. 4 is a perspective view showing the structure of a guide rail and a protector of an ash tray according to the present invention;

FIG. 5 is a perspective view showing partially one manner of engagement between the guide rail and the protector; and FIG. 6 is a longitudinal cross section showing the ash tray mounted on the bottom of an instrument panel according to the present invention.

DESCRIPTION OF THE PREFERRED EMBODIMENTS

FIG. 2 is an exploded perspective view showing an embodiment of an ash tray according to the present invention, independent of the instrument panel. This embodiment is formed of steel or the like and is shaped in a box-like unitary structure, comprising an outer casing 2 which is closed towards the rear, that is, the innermost portion as well as opened towards the front, that is, outwardly towards seated persons, and an inner casing 1 which is held by the outer casing 2 in such a manner that it can be drawn out and pushed in through an opening thereof. As is apparent from FIG. 3 which is a perspective front and bottom view of the outer casing 2, supporting rails 23 are provided on both sides thereof for supporting the inner case 1 so as to enable the inner casing 1 to slidably engage the outer casing 2. In addition, guide springs 3 and 4 are fitted on the upper faces of the supporting rails 23 on both sides of the outer casing 2 respectively, so as to press lid portions 24 (FIG. 2) which are provided on both sides of the inner casing 1 upon the supporting rails respectively, and, as a result, the whole inner casing 1 can be held stably and thereby prevented from falling out of the outer casing 2 upon any minor impact.

As shown in FIG. 4, inside of an upper plate of the outer casing 2, a partition plate 26 which is provided with a guide rail 5 on the front portion thereof is fixed thereon by a screw 16. This partition plate 26 having the guide rail 5 is formed separately from the outer casing 2, and sliding grooves 8 are formed on both side walls 14 of the guide rail 5, so as to provide a path which is extended towards the front and the rear ends of the outer casing 2 and end portions which are bent upwards slightly. A spring mount 15 is provided on the upper face of the guide rail 5, so as to hold firmly a resilient actuating member consisting of a spring between the outer casing 2 and itself, when the guide rail 5 is fitted to the bottom face of the upper plate of the outer casing 2. In addition the guide rail 5 is provided with a cut-out portion 11 which is extended outwardly from the rear edge thereof, and further with an abutting edge 18 at the position at which both side edges 13 of the cut-out portion 11 intersect the above rear edge, so as to hold a protector 6 which is so shaped as to be bent upwards as shown at the front of FIG. 3. The protector 6 is provided with protusions 10 on both sides thereof as well as with spring anchors 12 on the upper face thereof with which both ends, namely, actuating points of the above spring 7 are connected. Moreover, the protector 6 is held by engaging the side edges 13 of the cut-out portion 11 with the sliding grooves 8 of the guide rail 5, so as to enable the protector 6 to move along the path formed by those sliding grooves 8 as shown in FIG. 5, and so that the protector 6 moves outwardly and inwardly through a slightly bent path in a direction indicated by an arrow mark $S_2$ shown in FIG. 4 under the actuation of the force of the spring 7 and an external force which is imposed on the protector 6 thereagainst respectively. As shown in FIG. 2, ridges 9 are provided inside of the side walls of the inner casing 1, and, in the end portion of the inward movement of the inner casing 1, by which movement the inner casing 1 is pushed into the outer casing 2, the ridges 9 are abutted against the protusions 10 of the protector 6, so as to push the protector 6 into the innermost portion of the outer casing 2 together with the inner casing 1, and, as a result thereof, the above external force imposed against the spring 7 is obtained. On the other hand, the spring 7 actuates the protector 6 always in a direction in which the protector 6 is drawn out through the opening of the outer casing 2 in a position where the fulcrum of the spring 7 is fixed to the spring mount 15 and the actuating points thereof are clamped by the spring anchors 12, so that the protector 6 is pushed outwardly by the spring 7 as soon as the operator starts drawing out the inner casing 1. For the purpose of limiting the degree of such outward movement to a predetermined fix amount, a stopper 17 is provided on the bottom of the guide rail 5, so as to stop the outward motion of the protector 6 by abutting the stopper 17 against the abutting edge 18 provided on the rear edge of the protector 6.

The manner of installation of the ash tray according to the present invention which has the above-mentioned structure is shown in a longitudinal cross section set forth in FIG. 6. In this ash tray as soon as the inner casing 1 is drawn out by grasping a catch 22 thereof, the front end portion of the chamber 20 begins to be exposed outwardly. At the same time, the ridges 9 which are pushing the protector 6 into the innermost portion of the outer casing 2 against the actuating force of the spring 7 starts being released from engagement with the protusions 10, and, as a result thereof, the protector 6 starts moving outwardly through the slightly bent path along the sliding grooves 8 actuated by the force of the spring 7. As the inner casing 1 is further drawn out, the protector 6 is obliquely moved outwardly, and when the front end of the protector 6 reaches an open position indicated by a mark "A" as shown in FIG. 6, the stopper 17 which is provided on the bottom of the guide rail 5 is abutted upon the abutting edge of the protector 6, so as to stop the protector 6 at that position. As the inner casing 1 is further drawn out past the above position "A", and since the inner casing 1 can be moved independently from the guide rail 5 and the protector 6 fitted to the outer casing 2, the ridges 9 of the inner casing 1 are detached from the protusions 10 of the protector 6, and, as a result, only the inner casing 1 is further drawn out alone, whilst the protector 6 is held meanwhile to cover and protect the front of the instrument panel 19 when stopped by the aforesaid stopper 17.

As mentioned above, the protector 6 has already reached the open position A ending the outward movement thereof when the inner casing 1 is drawn out until the protusions 10 of the protector 6 are detached from the ridges 9 of the inner casing 1. Thus, no matter how long the inner casing 1 is further drawn out, the front of the instrument panel 19 can be protected perfectly by the protector 6, even if a half-smoked cigarette is extinguished on the inner casing or thrown thereto.

As the inner casing 1 is pushed into the outer casing 2 and fully contained therein, the ridges 9 of the inner casing 1 are abutted upon the protusions 10 of the protector 6, when the inner casing 1 is moved close to an intermediate position of the outward movement thereof. Therefore the protector 6 continues to protect the front of the instrument panel 19 by being projected in front thereof. After the ridges 9 are abutted against the protusions 10, as the inner case 1 is further pushed in, the protector 6 is slid along the sliding grooves 8 towards the innermost portion of the outer casing 2 against the actuating force of the spring 7, and, as a result, it is stopped by reaching the rear end of the sliding grooves 8 as it compresses the spring 7. At the same time as the protector 6 is stopped, the inner casing 1 is also entirely concealed at its innermost portion in the outer casing 2. In this state of the inner casing 1, although the inner casing 1 is affected by a pushing-out force of the compressed spring 7 through the protector 6, the guide springs 3 and 4 fitted to the outer casing 2 press the lid portions 24 of the inner casing 1 against the supporting rails 23 so that the inner casing can be securely held in its innermost position.

As is apparent from the explained above, according to the present invention, the protector actuated by the spring is fitted to the outer casing and cooperates therewith, so that, even if a half-smoked cigarette is extinguished in the inner casing or disposed therein the front of the instrument panel is always protected by the protector. Consequently, such dangers as the front of the instrument panel being scorched and fire of the vehicle being caused can be thoroughly avoided. Moreover, the protector is projected out or pulled in at the beginning of the drawing-out operation or at the end of the pressing-in of the inner casing respectively, so that the capacity of the butt accommodating chamber can be maximized, and any difficulty in cleaning of the ashtray, heretofore due to the presence of a protector, is obviated.

In addition, the above-mentioned structure of the ash tray according to the present invention can be modified as follows.

From the view point that the partition plate 26 having the guide rail 5 is fitted on the upper plate of the outer casing 2, upright walls are provided upwards on the rear portion of the partition plate 26, and further an expanded portion is formed on the upper plate of the outer casing 2, so as to provide the butt accommodating chamber thereunder, as well as to provide an illuminator in this chamber together with the guide rail 5.

What is claimed is:

1. An ashtray for mounting on a vehicle instrument panel having an outer casing adapted to accommodate and slidably receive an inner casing provided with a chamber for collecting butts and the like, comprising means for protecting said vehicle and instrument panel from scorching or burning, said means being slidably disposed within said outer casing; spring means having a fulcrum fixed to said outer casing and to at least one actuating point on said protecting means urging said protecting means outwardly and upwardly when said inner casing is withdrawn from said outer casing and beyond said protecting means.

2. An ash tray according to claim 1, wherein an abutting edge is provided on said protecting means as it is urged by said spring, and stop means on said outer casing are provided to engage said abutting edge to stop the outward sliding movement of said protecting means.

3. An ash tray according to claim 1, wherein the chamber for collecting butts and the like is enlarged by providing an expanded portion of an upper plate of said outer casing.

4. An ash tray according to claim 3, wherein illuminating means are provided inside of said expanded portion of said outer casing.

* * * * *